Nov. 8, 1932.  L. CAMPBELL, JR  1,886,640
LAND VEHICLE TRAIN
Filed April 27, 1929   2 Sheets-Sheet 1
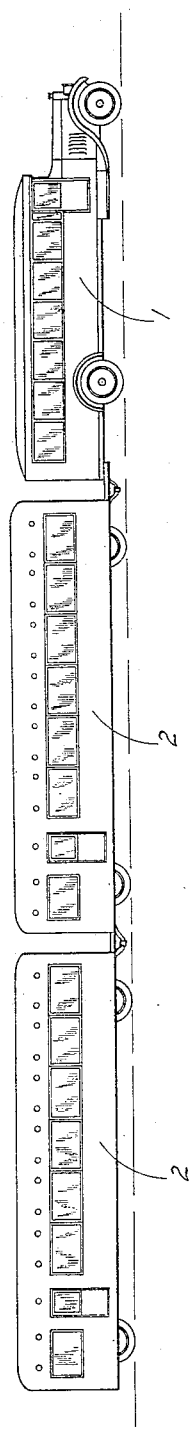
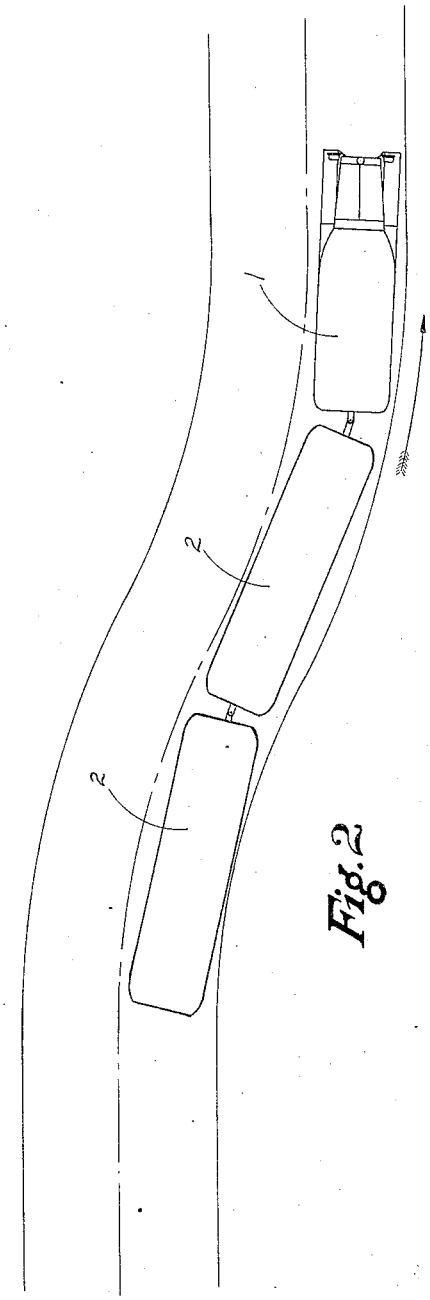
INVENTOR
LORN CAMPBELL JR.
BY Richey & Watts
ATTORNEY Nov. 8, 1932.                L. CAMPBELL, JR                1,886,640
                             LAND VEHICLE TRAIN
                    Filed April 27, 1929        2 Sheets-Sheet 2

INVENTOR
LORN CAMPBELL JR.
BY Richey & Watts
ATTORNEY

Patented Nov. 8, 1932

1,886,640

UNITED STATES PATENT OFFICE

LORN CAMPBELL, JR., OF CLEVELAND, OHIO

LAND VEHICLE TRAIN

Application filed April 27, 1929. Serial No. 358,567.

This invention relates to land vehicle trains and more particularly to such trains composed of a tractor or propeller preferably in the form of a bus or the like and one or more trailers, each preferably constructed for the carrying of passengers.

Heretofore, to the best of my knowledge, the art of land vehicle trains has been confined exclusively to freight transportation, the trains being composed of a tractor which usually was a truck and to which was attached one or more freight carrying trailers. Although my invention includes many features which are applicable alike to freight carrying and passenger carrying trains. It is primarily directed to trains for carrying passengers.

The art of land vehicle trains, particularly for transporting passengers on highways is practically undeveloped at the present time due largely, I believe, to the fact that many factors difficult of solution are involved in such trains. The carrying of passengers in busses has developed so rapidly and widely throughout the country and the number of busses is increasing so rapidly that the use of trains has become a necessity.

The use of trains will not only cheapen the cost of transportation because of decreasing the numbers of engines and drivers required but will also tend to decrease the crowded condition of the highways by limiting the number of independent busses and occupying less space than separate disconnected busses.

Some of the many obstacles which have retarded the development of land vehicle trains are as follows:

The trailers or drawn vehicles must be steered so that they will always track with the tractor, bus or other driven vehicle which furnishes the motive power for the train and so that the entire train will turn corners even though they be quite sharp and follow curves in the road without occupying much, if any, more space at the corners and curves than is occupied by the tractor. Unless the train functions as just described there will be danger of accidents when turning corners, passing parked vehicles and turning into other lanes of travel, with other traffic on the road.

The means of coupling the vehicles of the train should preferably guide the respective vehicles of the train automatically and at the same time permit the vehicles to pass over uneven roads without exerting any undue action either on the steering gear of the vehicles or strain on the coupled vehicles.

The respective vehicles of a train should be coupled in such a manner that starting and stopping shocks will be transmitted in the least amount to the bodies of the vehicles. This has not been necessary heretofore in freight trains but it is particularly desired where the vehicles are equipped with sleeping facilities, such as berths and the like.

It is therefore among the objects of my invention to provide an improved steering means for the drawn vehicles of a vehicular train.

Another object is to provide means for steering the drawn vehicles of a vehicle train in such a manner that the drawn vehicles will follow closely in the path of the driven vehicle.

Another object of the invention relates to an improved manner of coupling the respective vehicles of a train whereby the usual shocks and jolts due to a starting and stopping of the train may be minimized.

Still other objects relate to the improved mechanical combinations whereby the above objects are accomplished and which will become more apparent from a reference to the drawings and the following description thereof.

In the drawings accompanying and forming a part of this application

Fig. 1 is a side elevation of a land vehicle passenger carrying train embodying my invention;

Fig. 2 is a top plan view of the train of Figure 1 showing the same rounding a curve in a road;

In Figs. 1 and 2 I have shown one form of land vehicle train embodying my invention in which character 1 designates the driven vehicle, here shown in the form of a passenger carrying bus, and 2 designates drawn vehicles, also of the passenger carrying type. It will be noted in Figure 2 that the drawn vehicles, or trailers 2, follow and track with the bus 1 while rounding an S-curve and that none of the vehicles project beyond the lane in which the bus 1 travels.

Figure 3:
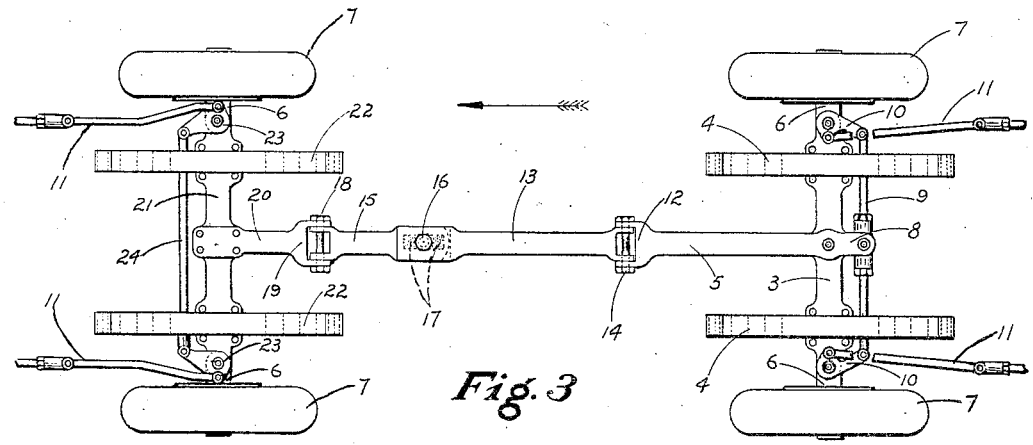
Fig. 3 is an enlarged fragmentary top plan view illustrating one form of coupling together the respective vehicles of the train of Fig. 1.
Figure 4:
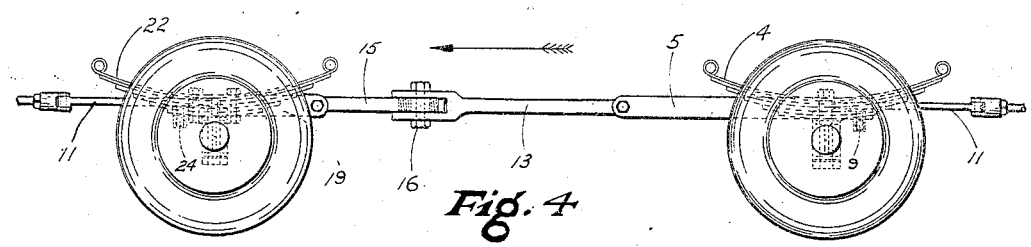
Fig. 4 is a fragmentary view in side elevation of the apparatus of Fig. 3.
Figure 5:
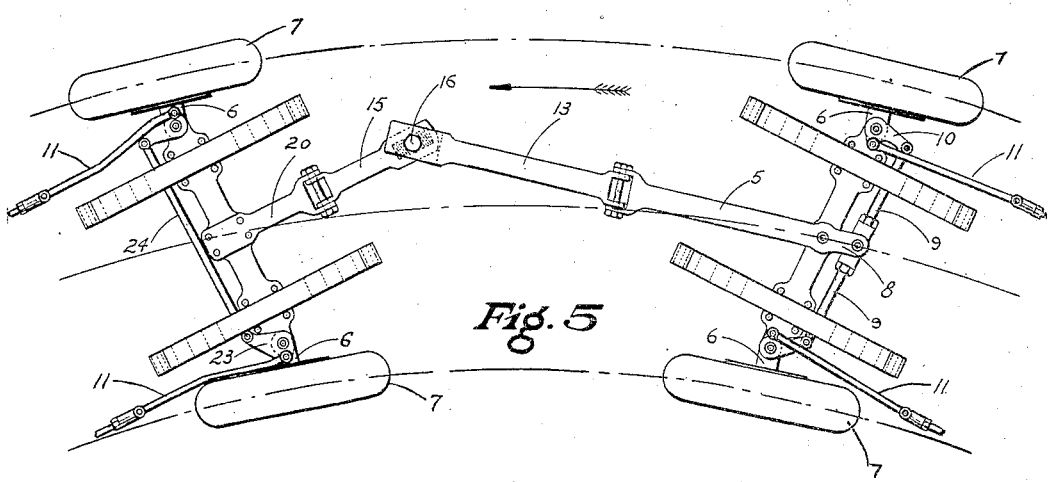
Fig. 5 shows the apparatus of Fig. 3 while turning a corner.

In Figs. 3, 4 and 5 I have shown fragmentarily the rear axle of one drawn vehicle and the front axle of the drawn vehicle immediately therebehind together with coupling means for uniting the two vehicles and guiding the rear one of the two. It will be understood that all of the vehicles shown in this application have resiliently tired wheels and that the driven or powered vehicle has steering wheels only on the forward end thereof with the usual non-steering wheels on the rear axle, whereas the drawn vehicles have steering wheels on each end. The drawn vehicles of Figs. 1 and 2 each have a front axle 3 which is stationary and carries springs 4 for attachment to the body or frame of the vehicle and also have pivoted to the front axles 3 a rigid bar 5 adapted to transmit propelling power to the axle 3 and also adapted to steer the vehicle to whose front axle it is attached. At each end of the stationary axle 3, the usual stub axles 6 are pivotally connected and carry wheels 7 rotatably mounted thereon. The bar 5 projects forwardly from the axle 3 and also rearwardly of the axle 3 where it is formed with an extension 8 which is secured to a cross rod 9 pivotally connected to steering arms or knuckles 10 which in turn are fixedly secured to the stub axles 6 to turn the latter when the rod 9 is shifted transversely of the vehicles by extension 8 of bar 5. Each steering arm 10 has pivoted thereto a rod 11 which extends to the rear of the vehicle and makes connection with the steering wheels of the rear axle in a manner presently to be described.

The bar 5 projects forwardly from the front axle of each drawn vehicle and is adapted for swinging movement in a substantially horizontal plane. At its forward end, the bar 5 is bifurcated as at 12 and pivotally carries a rigid arm 13 for movement in a substantially vertical plane about the pivot pin 14 which joins the members 5 and 13. At the forward end of member 13 another similar member 15 is pivoted thereto with a substantially vertical pivot pin 16 which by reason of springs 17 mounted on either side thereof and housed by the members 13 and 15 permits a certain amount of lost motion between the latter members to permit pivoting of these members about the pin 16 and to absorb some of the shocks incident to starting or stopping the connected vehicles. The forward end of arm 15 is pivoted, as by a pivot pin 18, in the bifurcated end 19 of a rigid arm 20 fixedly secured to the rear of the next forward vehicle. In Figure 3 the arm 20 is fixedly attached to the stationary axle 21 of the next forward vehicle, which is shown as being a drawn vehicle with all four wheels mounted for steering purposes. This axle 21 carries springs 22 which may closely resemble springs 4 of the front axle of the next following drawn vehicle.

The construction of the rear axle and associated parts about to be described is typical of the rear axle construction of each of the drawn vehicles of Figures 1 and 2. The stationary axle 21 is provided with stub axles 6 pivoted thereto for turning movement, as in steering, and each stub axle carries a wheel 7 rotatably mounted thereon. A steering knuckle 23 is pivotally secured to each stub axle 6 and the two knuckles are connected by a tie-rod 24. Each knuckle 23 is also pivotally connected to extensions of rods 11 which extend rearwardly from the knuckles 10 of the front axle.

It will be understood that each powered or driven vehicle will be provided with an arm corresponding to arm 20 of Figure 3 and attached preferably to the rear axle of the drawn vehicle but optionally to the frame or body of the latter.

In Figure 5 where the apparatus of Figures 3 and 4 is shown in the position assumed by the various parts while the two vehicles are turning a corner, it will be noted that the arms 13 and 16 have pivoted about the pivot pin 16 and that the arm 5 has actuated the tie-rods 9 and 24 thereby pivoting the wheels 7 so that they traverse the same radius as the wheels of the next preceding vehicle.

It will be understood by those skilled in the art that, by my invention, the difficulties enumerated hereinbefore have been overcome in a simple but extremely efficient manner. The means provided for steering the drawn vehicles insures that they will follow and substantially track with the driven vehicle and that the entire train will turn corners, even though they be quite sharp, and follow curves in the road without occupying materially more space than is occupied by the driven vehicle. Moreover, the coupling means between the respective vehicles automatically guide the vehicles and permit the vehicles to pass over uneven roads without interfering with the proper functioning of the coupling and guiding means. Furthermore, the vehicles are coupled together in a new and improved manner so that the shocks incident to starting and stopping the train are in part absorbed by the springs 17, in the coupling devices and other such shocks are transmitted to the body of the vehicles through the body supporting springs and the usual shock absorbers so that only a limited amount, if any, of the starting and stopping shocks are actually transmitted to the bodies of the vehicles in an amount which would be felt by the load or passengers in the vehicles.

Having thus described my invention so that those skilled in the art may be enabled to understand and practice the same what I desire to secure by Letters Patent is defined in what is claimed, it being understood that the scope of my invention is not limited to the details set forth hereinabove which were given for purposes of illustration only.

What is claimed is:

1. A land vehicle train including a driven vehicle and a drawn vehicle, the drawn vehicle having stationary axles, stub axles pivotally carried by said stationary axles, wheels rotatably mounted on the several stub axles, steering knuckles movable with each of said stub axles, means directly connecting together the knuckles of each axle, means directly connecting together the knuckles of each side of the vehicle for simultaneous pivotal movement of the said stub axles, and means connecting the driven vehicle to the drawn vehicle for drawing and steering the drawn vehicle, said means including a member rigidly secured to the rear of the driven vehicle and extending rearwardly therefrom, a rigid member pivotally secured to the front axle of the drawn vehicle and extending rearwardly and forwardly therefrom, adapted to swing in a horizontal plane, means to connect said last mentioned member to said steering knuckles and means connecting said rigid member on the driven vehicle to said pivotal member on the drawn vehicle to allow relative vertical and horizontal movement therebetween.

2. A land vehicle train including a plurality of vehicles each having stationary front and rear axles, wheel-carrying stub axles pivoted at the ends of the said axles, wheels rotatably mounted on the said axles, means directly connecting together the stub axles on each axle, means directly connecting together the stub axles on each side of the vehicle and means for connecting the rear of one vehicle to the front of the following vehicle, said means including a rigid member projecting rearwardly from the rear of one vehicle, a rigid member projecting forwardly of the front axle of the following vehicle and pivoted thereto, and means connecting the rearwardly and forwardly extending rigid members including a connecting linkage comprising a pair of links pivoted together on vertical axis and to rigid end members on horizontal axis.

3. A land vehicle train including a plurality of vehicles each having stationary front and rear axles, wheel-carrying stub axles pivoted at the ends of the said axles, wheels rotatably mounted on the said stub axles, means directly connecting the steering knuckles and means for connecting the rear of one vehicle to the front of the following vehicle, said means including a rigid member projecting rearwardly from the rear axle of one vehicle, a rigid member projecting forwardly of the front axle of the following vehicle and pivoted to the knuckle connecting means, and means connecting the rearwardly and forwardly extending rigid members including a connecting linkage comprising a pair of links pivotally connected to the rigid members on horizontal pivots and to each other by a vertical pivot in a slot in one part and with spring means on either side of the vertical pivot permitting movement of the pivot in the slot.

In testimony whereof I hereunto affix my signature this 23d day of April, 1929.

LORN CAMPBELL, JR.